3,251,675
METHOD OF INHIBITING PLANT GROWTH
Herman O. Senkbeil, Midland, Mich., assignor to The Dow Chemical Company, Midland, Mich., a corporation of Delaware
No Drawing. Filed Dec. 28, 1961, Ser. No. 162,954
6 Claims. (Cl. 71—2.7)

The present invention is directed to methods employing and compositions comprising O-alkyl N,N'-dialkyl phosphorodiamidothioates corresponding to the formula

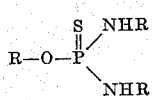

In this and succeeding formulae, each R represents a lower alkyl radical. The expression "lower alkyl" is employed in the present specification and claims to refer to the radicals containing from 1–5 carbon atoms, inclusive. These new compounds are oily liquids or crystalline solid materials which are somewhat soluble in many common organic solvents and of low solubility in water. The compounds are useful in methods where they or compositions containing the compounds are employed as plant growth control materials for the modification of the growth or the killing of many undesirable plant species.

The new compounds are prepared by reacting an O-lower alkyl phosphorodichloridothioate with ammonia or lower alkyl amines. Thus, the phosphorodichloridothioate reagent is reacted with ammonia or a lower alkyl amine, or successively with two different members of the group consisting of ammonia and lower alkyl amine, depending upon whether or not it is desired to replace the phosphorus bound chlorine in the phosphorodichloridothioate reagent with the same or different substituting moieties. Where two different amide moieties are introduced into the molecule, the introduction of the first amide moiety results in the production of an O-alkyl N-alkyl phosphoramidochloridothioate intermediate. The reaction conveniently is carried out in a liquid reaction medium such as methylene chloride, acetone, water, benzene and so forth. The reaction is somewhat exothermic and takes place smoothly at the temperature range of from −20° to 50° C. with the formation of the desired product and ammonium chloride and/or amine hydrochloride of reaction. The temperature may be controlled by regulating the rate of contacting the reactants and by external cooling. Good results are obtained when employing two molecular proportions of ammonia or amine reagent with each gram atom of phosphorus bound chlorine it is desired to displace in the phosphorodichloridothioate reagent. Following the reaction, the desired product is separated and purified by conventional procedures.

In carrying out the reaction, gaseous ammonia and/or alkyl amine is contacted in any convenient manner with the phosphorodichloridothioate reagent and preferably in a solvent as reaction medium. In an alternative procedure, an aqueous solution of ammonia and/or alkyl amine is mixed and blended with the phosphorodichloridothioate reagent. In either case, the contacting of the reagents is brought about usually portionwise and with stirring and at a temperature of from −20° to 50° C. Following the contacting of the reagents, the mixture is usually stirred for a short period to insure completion of the reaction. Upon completion of the reaction, the reaction product is washed with water to separate ammonium chloride or amine hydrochloride. If the reaction is carried out in a water-miscible solvent, the washing step leaves the desired product as a residue. If the reaction is carried out in one of the water-immiscible solvents, the solvent may be removed by evaporation or vacuum distillation following the washing step to obtain the desired product as a liquid or crystalline residue.

The following examples merely illustrate the invention and are not to be construed as limiting.

Example 1.—O-ethyl N,N'-dibutyl phosphorodiamidothioate

N-butylamine (87.6 grams; 1.2 moles) was added portionwise to 53.7 grams (0.3 mole) of O-ethyl phosphorodichloridothioate dispersed in 600 milliliters of benzene. The addition was carried out over a period of 1.5 hours and at a temperature of from 4° to 6° C. Stirring was thereafter continued and the temperature of the reaction mixture maintained at from 5° to 10° C. for 16 hours to complete the reaction. The reaction mixture was then cooled to room temperature and the cooled mixture filtered to separate butylamine hydrochloride. The benzene was removed from the filtrate by vacuum distillation and the residue dispersed in carbon bisulfide. The carbon bisulfide dispersion was then filtered and the carbon bisulfide removed from the filtrate by evaporation under vacuum to obtain an O-ethyl N,N'-dibutyl phosphorodiamidothioate product as a liquid residue having a refractive index n/D of 1.4864 at 25° C., a specific gravity of 1.0204 at 25°/25° C. and a sulfur content of 12.5 percent.

Example 2.—O-propyl N,N'-diisopropyl phosphorodiamidothioate

Isopropylamine (519.2 grams; 8.8 moles) was added portionwise with stirring to 386 grams (2.0 moles) of O-propyl phosphorodichloridothioate dispersed in 3 liters of methylene chloride. The addition was carried out over a period of 4 hours and at a temperature of from 5° to 8° C. Stirring was thereafter continued and the reaction mixture maintained at a temperature of from 2° to 3° C. for 16 hours to complete the reaction. The reaction mixture was then filtered and the methylene chloride removed from the filtrate by evaporation under reduced pressure to obtain an O-propyl N,N'-diisopropyl phosphorodiamidothioate product as a liquid residue. This product had a refractive index n/D of 1.4830 at 25° C., a specific gravity of 1.0144 at 25°/25° C. and a phosphorus content of 12.8 percent.

Example 3.—O-butyl N-sec. butyl N'-isobutyl phosphorodiamidothioate

Isobutylamine (30 grams; 0.41 mole) was added portionwise with stirring to 41.4 grams (0.2 mole) of O-butyl phosphorodichloridothioate dispersed in 500 milliliters of benzene. The addition was carried out over a period of one hour and at a temperature of from 5° to 15° C. Sec. butylamine (31 grams; 0.425 mole) was then added portionwise with stirring to the above solution containing the O-butyl N-isobutyl phosphoramidochloridothioate intermediate. This addition was carried out over a period of one hour and at a temperature of 5° C. Upon completion of the reaction, the reaction mixture was filtered and the reaction medium removed from the filtrate by evaporation under reduced pressure to obtain an O-butyl N-sec. butyl N'-isobutyl phosphorodiamidothioate product as a liquid residue. This product had a refractive index n/D of 1.4803 at 25° C., a specific gravity of 0.9807 at 25°/25° C. and a phosphorus content of 10.9 percent.

In exactly analogous manners, other products of the present invention were employed and are as follows:

| Phosphorodiamidothioates | Melting point, °C. | n/D at 25° C. | Specific gravity at 25°/25° C. |
|---|---|---|---|
| O-methyl N,N'-dibutyl | | 1.4950 | 1.0293 |
| O-methyl N,N'-diisopropyl | | 1.4973 | 1.0546 |
| O-ethyl N,N'-diisopropyl | 25–28 | | |
| O-butyl N,N'-dibutyl | | 1.4815 | 0.9894 |
| O-methyl N,N'-diethyl | | 1.5050 | 1.1260 |
| O-ethyl N,N'-diethyl | 38–42 | | |
| O-propyl N,N'-dibutyl | | 1.4845 | 0.9992 |
| O-butyl N,N'-diisopropyl | | 1.4815 | 0.9922 |
| O-isobutyl N,N'-di-tert-butyl | | 1.4820 | 1.0047 |
| O-isopropyl N,N'-diisopropyl | 24–26.5 | | |
| O-isobutyl N,N'-diisopropyl | 44–7 | | |
| O-propyl N,N'-di-sec. butyl | | 1.4826 | 0.9966 |
| O-butyl N,N'-diisobutyl | | 1.4795 | 0.9808 |
| O-propyl N-isopropyl N'-methyl | | 1.5001 | 1.0962 |
| O-isopropyl N-sec. butyl N'-isopropyl | | 1.4808 | 1.0120 |
| O-propyl N,N'-di-tert-butyl | | 1.4953 | |
| O-propyl N,N'-dimethyl | | 1.5031 | 1.0969 |
| O-butyl N,N'-dimethyl | | 1.4983 | 1.0753 |
| O-propyl N,N'-diethyl | | 1.4916 | 1.0470 |
| O-butyl N,N'-diethyl | | 1.4890 | 1.0312 |
| O-propyl N,N'-dipropyl | | 1.4869 | 1.0154 |
| O-butyl N,N'-dipropyl | | 1.4856 | 1.0014 |
| O-isopropyl N,N'-dimethyl | | 1.4984 | 1.0874 |
| O-isobutyl N,N'-dimethyl | | 1.4956 | 1.0675 |
| O-ethyl N,N'-dipropyl | | 1.4895 | 1.0292 |
| O-sec. butyl N,N'-diisopropyl | | 1.4800 | 0.9947 |
| O-isopropyl N,N'-dipropyl | | 1.4891 | 1.0115 |
| O-isobutyl N,N'-dipropyl | | 1.4886 | 0.9982 |
| O-sec. butyl N,N'-dibutyl | 31.5–32 | | |
| O-sec. butyl N,N'-di-sec. butyl | | 1.4796 | 0.9790 |
| O-sec. butyl N,N'-dimethyl | 44–5 | | |
| O-sec. butyl N,N'-dipropyl | | 1.4891 | 1.0017 |
| O-methyl N,N'-di-sec. butyl | | 1.4953 | 1.0525 |
| O-pentyl N,N'-dimethyl | | 1.4950 | 1.0503 |
| O-pentyl N,N'-dipropyl | | 1.4830 | 0.9950 |
| O-sec. butyl N,N'-diethyl | | 1.4876 | 1.0270 |
| O-isobutyl N,N'-diethyl | | 1.4850 | 1.0212 |
| O-sec. butyl N,N'-di-tert-butyl | | 1.4860 | 1.0314 |
| O-isopropyl N,N'-diisobutyl | 45.5–47.5 | | |
| O-isobutyl N,N'-diisobutyl | | 1.4775 | 0.9730 |
| O-isobutyl N,N'-dibutyl | | 1.4805 | 0.9793 |
| O-sec. butyl N,N'-diisobutyl | | 1.4802 | 0.9878 |
| O-propyl N,N'-diisobutyl | | 1.4808 | 0.9837 |
| O-isopentyl N,N'-diisopropyl | 25–35 | | |
| O-pentyl N,N'-diisopropyl | | 1.4801 | 0.9840 |

The new phosphorodiamidothioates of the present invention have been evaluated and found to be useful as parasiticides for the control of insects such as worms and particularly as plant growth control agents for the modification of the growth and the killing of many plants. In such use, the unmodified compounds can be employed as compositions comprising the compounds in admixture with a herbicide adjuvant as a carrier therefor. Thus, the products can be dispersed on a finely divided solid such as a talc, chalk, or a finely divided solid surface active dispersing agent such as bentonite and the resulting compositions employed as dusts. Also, such mixtures can be dispersed in water with or without the aid of a dispersing agent and the resulting aqueous suspensions employed as sprays. In other procedures, the products are employed as active constituents of solvent solutions, oil-in-water or water-in-oil emulsions, or water dispersions with or without suitable surface active dispersing agents. The new compounds or compositions containing such compounds are applied to the foliage of vegetation or dispersed in soil to expose plants, plant rootlets and plant parts, such as seeds, to growth inhibiting and herbicidal amounts of the compounds. In representative operations, the application of the compunds to soil at a dosage of 50 pounds per acre gives excellent control of many plant species in pre-emergent applications such as millet, radish and wild oats, while the application of aqueous compositions containing 4000 parts per million by weight of the phosphorodiamidothioates gives excellent control of the same species in such post-emergence applications.

The O-alkyl phosphorodichloridothioates employed as starting materials in accordance with the teachings of the present invention are prepared in accordance with known procedures, wherein phosphorus thiochloride is reacted with a suitable alcohol. Good results are obtained when operating at temperatures of from 30° to 70° C. and when employing the alcohol with a molar excess of the phosphorus thiochloride. Upon completion of the reaction, the desired starting material is separated by fractional distillation under reduced pressure.

What is claimed is:

1. A method which comprises exposing plants and plant parts to the action of a growth inhibiting amount of a phosphorus compound corresponding to the formula

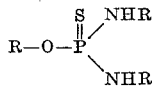

wherein each R represents lower alkyl.

2. A method claimed in claim 1 wherein the phosphorus compound is O-ethyl N,N'-diethyl phosphorodiamidothioate.

3. A method claimed in claim 1 wherein the phosphorus compound is O-ethyl N,N'-diisopropyl phosphorodiamidothioate.

4. A method claimed in claim 1 wherein the phosphorus compound is O-propyl N,N'-diisopropyl phosphorodiamidothioate.

5. A method claimed in claim 1 wherein the phosphorus compound is O-butyl N,N'-diisopropyl phosphorodiamidothioate.

6. A method claimed in claim 1 wherein the phosphorus compound is O-isobutyl N,N'-diisobutyl phosphorodiamidothioate.

References Cited by the Examiner
UNITED STATES PATENTS

| 2,151,380 | 3/1939 | Flint et al. | 260—461 |
| 2,841,486 | 7/1958 | Osborn et al. | 71—2.7 |
| 2,894,019 | 7/1959 | Maeder | 260—461 |
| 2,957,018 | 10/1960 | Baker | 71—2.7 X |
| 2,964,467 | 12/1960 | Markley | 71—2.7 |
| 2,993,775 | 7/1961 | Baker | 71—2.7 |

LEWIS GOTTS, *Primary Examiner.*

MORRIS LIEBMAN, MAURICE A. BRINDISI, JULIAN S. LEVITT, *Examiners.*

JOHNNIE R. BROWN, JAMES O. THOMAS, *Assistant Examiners.*